United States Patent
Konishi

(10) Patent No.: US 8,483,079 B2
(45) Date of Patent: Jul. 9, 2013

(54) SIGNAL PROCESSING SYSTEM, SIGNAL PROCESSING APPARATUS, SIGNAL PROCESSING PROGRAM FOR TEST MEASUREMENT

(75) Inventor: Yasuaki Konishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 306 days.

(21) Appl. No.: 12/857,084

(22) Filed: Aug. 16, 2010

(65) Prior Publication Data
US 2011/0205917 A1 Aug. 25, 2011

(30) Foreign Application Priority Data
Feb. 19, 2010 (JP) .................. 2010-035392

(51) Int. Cl.
*H04J 1/16* (2006.01)
*H04L 12/56* (2006.01)

(52) U.S. Cl.
CPC .................. *H04L 47/10* (2013.01)
USPC .................. 370/252; 370/201

(58) Field of Classification Search
CPC .................. H04L 47/10
USPC .................. 370/201, 216–252; 714/22, 25, 714/715, 720; 324/628
See application file for complete search history.

(56) References Cited

U.S. PATENT DOCUMENTS

| 5,821,760 A | 10/1998 | Koeman et al. |
| 7,164,273 B2 * | 1/2007 | Bailey .................. 324/508 |
| 2008/0049716 A1 * | 2/2008 | Munguia et al. .............. 370/351 |
| 2008/0164885 A1 * | 7/2008 | Hemingway et al. .......... 324/628 |
| 2008/0310304 A1 * | 12/2008 | Edwards et al. .............. 370/234 |
| 2010/0157813 A1 * | 6/2010 | Matsuura .................. 370/242 |

FOREIGN PATENT DOCUMENTS
JP  A-10-78468  3/1998

* cited by examiner

Primary Examiner — Kan Yuen
(74) Attorney, Agent, or Firm — Oliff & Berridge, PLC

(57) ABSTRACT

A signal processing system that includes a transmitter component, a receiver component, a comparison component and an execution component is provided. The transmitter component transmits a predetermined detection signal, using one or other of a plurality of signal lines of a transmission path. The receiver component receives an interference signal, occurring in a different signal line from the signal line the transmitter component used for transmitting the detection signal, the interference signal occurring from interference due to the detection signal transmitted from the transmitter component. The comparison component compares a voltage value of the interference signal received by the receiver component with a predetermined reference voltage value. The execution component, based on a comparison result of comparison by the comparison component, executes predetermined processing according to the comparison result.

6 Claims, 8 Drawing Sheets

FIG.8

| CABLE LENGTH (m) | THRESHOLD VALUE VOLTAGE (mV) |
|---|---|
| 1 | 400 |
| 2 | 350 |
| 3 | 300 |
| 5 | 250 |
| 10 | 100 |

SIGNAL PROCESSING SYSTEM, SIGNAL PROCESSING APPARATUS, SIGNAL PROCESSING PROGRAM FOR TEST MEASUREMENT

CROSS-REFERENCE TO RELATED APPLICATION

This application is based on and claims priority under 35 USC 119 from Japanese Patent Application No. 2010-035392 filed Feb. 19, 2010.

BACKGROUND

1. Technical Field

The present invention relates to a signal processing system, a signal processing apparatus, and a signal processing program.

2. Related Art

A test measurement device is known for measuring near-end crosstalk response of in a patch code.

SUMMARY

According to an aspect of the invention, there is provided a signal processing system that includes: a transmitter component that transmits a predetermined detection signal, using one or other of a plurality of signal lines of a transmission path; a receiver component that receives an interference signal, occurring in a different signal line from the signal line the transmitter component used for transmitting the detection signal, the interference signal occurring from interference due to the detection signal transmitted from the transmitter component; a comparison component that compares a voltage value of the interference signal received by the receiver component with a predetermined reference voltage value; and an execution component that, based on a comparison result of comparison by the comparison component, executes predetermined processing according to the comparison result.

BRIEF DESCRIPTION OF THE DRAWINGS

An exemplary embodiment of the present invention will be described in detail based on the following figures, wherein:

FIG. 8 is an explanatory diagram for explaining a specific example of correspondence relationship, between cable length and threshold value voltage, pre-stored in a storage section of an image forming apparatus according to the present exemplary embodiment.

DETAILED DESCRIPTION

Detailed explanation follows of an exemplary embodiment of the present exemplary embodiment, with reference to the drawings.

Figure 1:
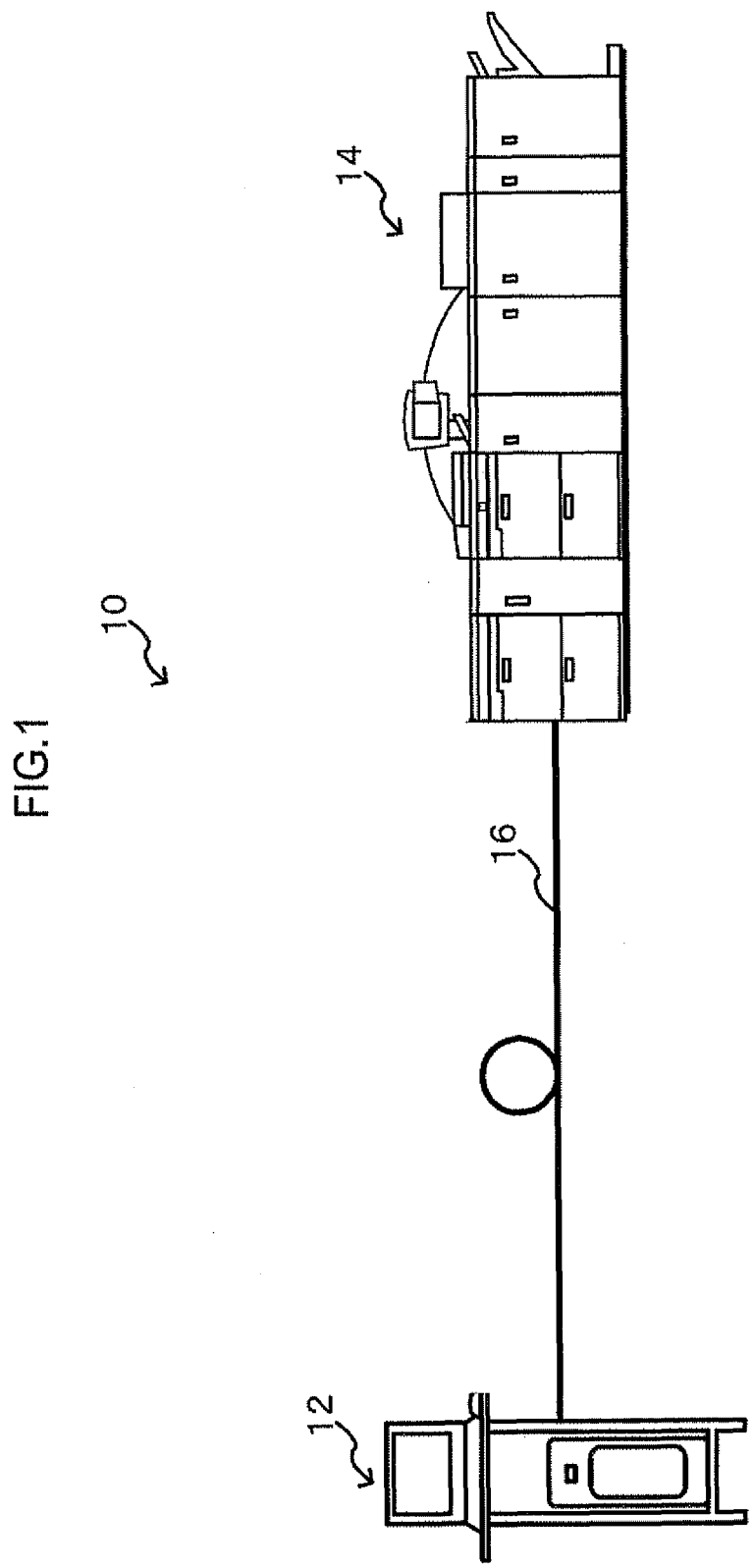
FIG. 1 is a schematic diagram showing an example of a schematic configuration of a signal processing system according to the present exemplary embodiment.

First, explanation follows regarding an overall schematic configuration of a signal processing system according to the present exemplary embodiment. FIG. 1 shows a schematic configuration of a signal processing system of the present exemplary embodiment, however there is no limitation thereto. Detailed explanation follows of a case where main control of detection of the quality of a cable 16 is performed by an image forming apparatus 14 in the signal processing system 10 of the present exemplary embodiment,.

The signal processing system 10 of the present exemplary embodiment includes a controller 12 that transmits signals, such as a signal expressing image data and a control signal relating to image forming, and the image forming apparatus 14 that is controlled by the controller 12.

Figure 2:
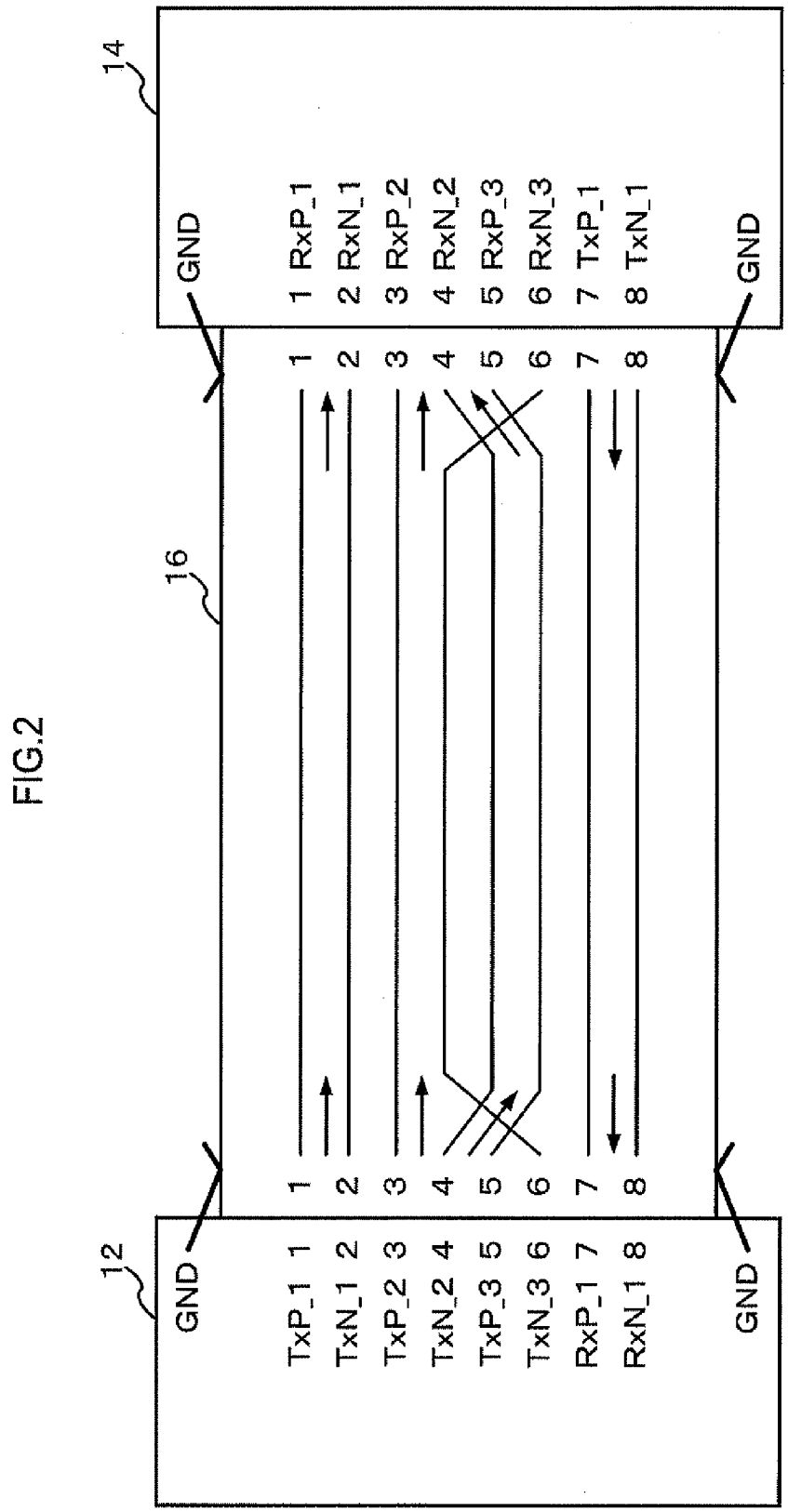
FIG. 2 is an explanatory diagram for explaining a specific example according to the present exemplary embodiment of a cable that is a transmission path.

The controller 12 and the image forming apparatus 14 of the present exemplary embodiment are connected together by the cable 16 that serves as a transmission path for signals transmitted and received between the controller 12 and the image forming apparatus 14. FIG. 2 shows an explanatory diagram for explaining a specific example of the cable 16 according to the present exemplary embodiment. The cable 16 is a transmission path including plural difference signal lines (referred to below simply as signal lines), and the present exemplary embodiment, as a specific example thereof, employs an ETHERNET (registered trade mark) 4 pair/8 core twisted pair category 7 (CAT 7) straight type cable. As shown in FIG. 2, the 8 signal lines are configured with the following pairings: pin 1 signal line and pin 2 signal line; pin 3 signal line and pin 6 signal line; pin 4 signal line and pin 5 signal line; and pin 7 signal line and pin 8 signal line. Note that CAT 7 cable has magnetic shielding for each pair of signal lines, and is also magnetically shielded by foil and embedded mesh composition rendered to the surface of the cable as a whole.

Figure 3:
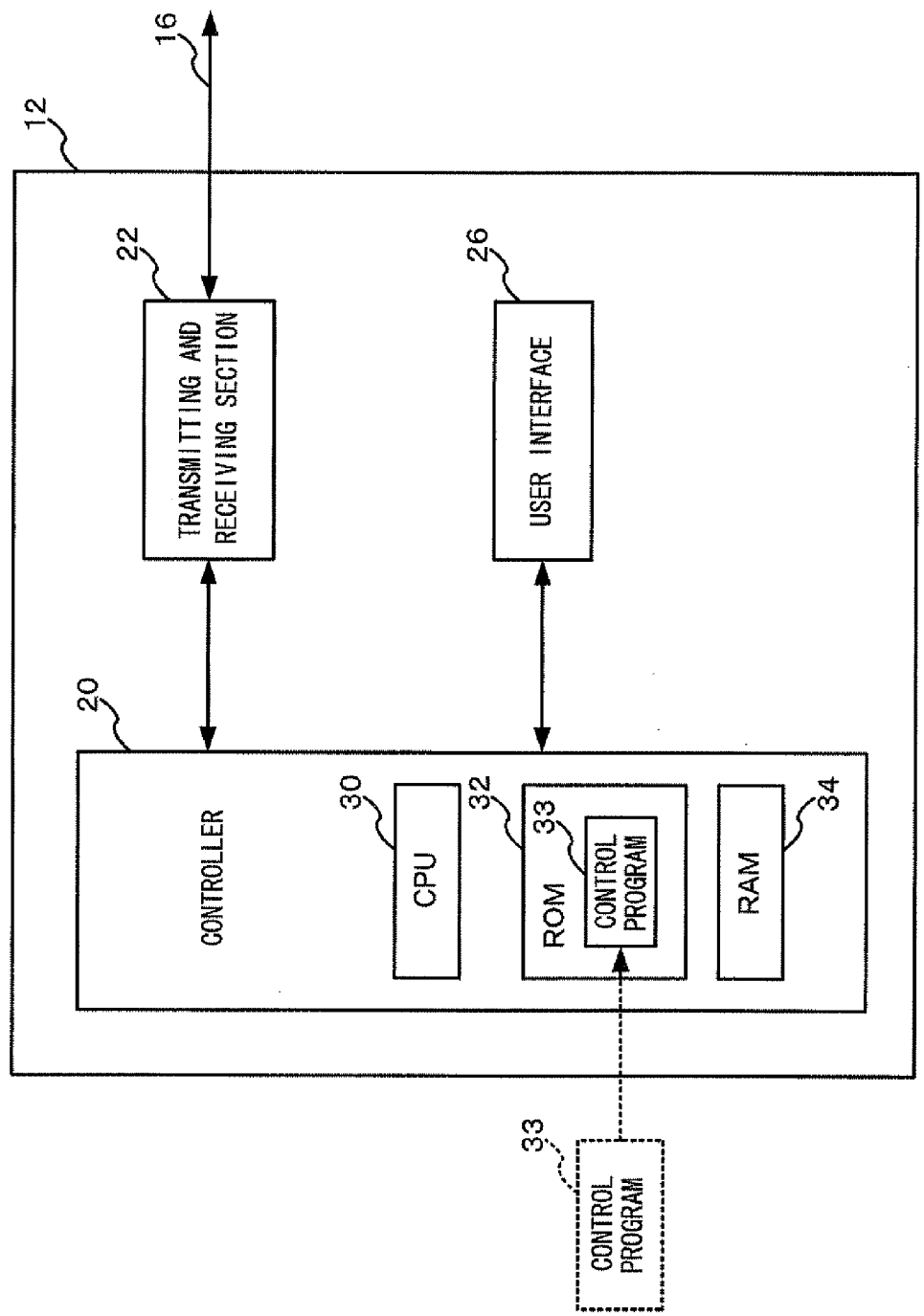
FIG. 3 is a functional block diagram showing an example of a schematic configuration of a controller according to the present exemplary embodiment.

A functional block diagram of an example schematic configuration of the controller 12 is shown in FIG. 3. The controller 12 of the present exemplary embodiment is configured including a controller 20, a transmitting and receiving section 22, and a user interface 26.

The controller 20 performs overall control of the operation of the controller 12, and specifically, is configured with a CPU 30, ROM 32, and RAM 34. A control program 33, executed by the CPU 30 for control, is stored in the ROM 32. In the present exemplary embodiment, the control program 33 is configured pre-stored, however there is no limitation thereto. Configuration may be made such that the control program 33 is stored on a storage medium, such as, for example, a CD-ROM or a removable disk, and installed in the controller 20 from the storage medium, or configuration may be made with the control program 33 installed to the controller 20 from an external device through a communication line, such as, for example, the Internet or the like. The RAM 34 secures an operational region for when the control program 33 is executed by the CPU 30.

The transmitting and receiving section 22 is for transmitting and receiving various signals to and from the image forming apparatus 14 through the cable 16, such as, for example, signals expressing image data, test signals (described in detail below), and other control signals. A plug of the cable 16 is therefore connected to a connector provided to the transmitting and receiving section 22.

The user interface 26 has functionality for receiving various instructions input by a user, and displaying various information to a user, and the like. Specific examples of the user interface 26 include a touch panel, a display, a keyboard, speakers, and the like.

Figure 4:
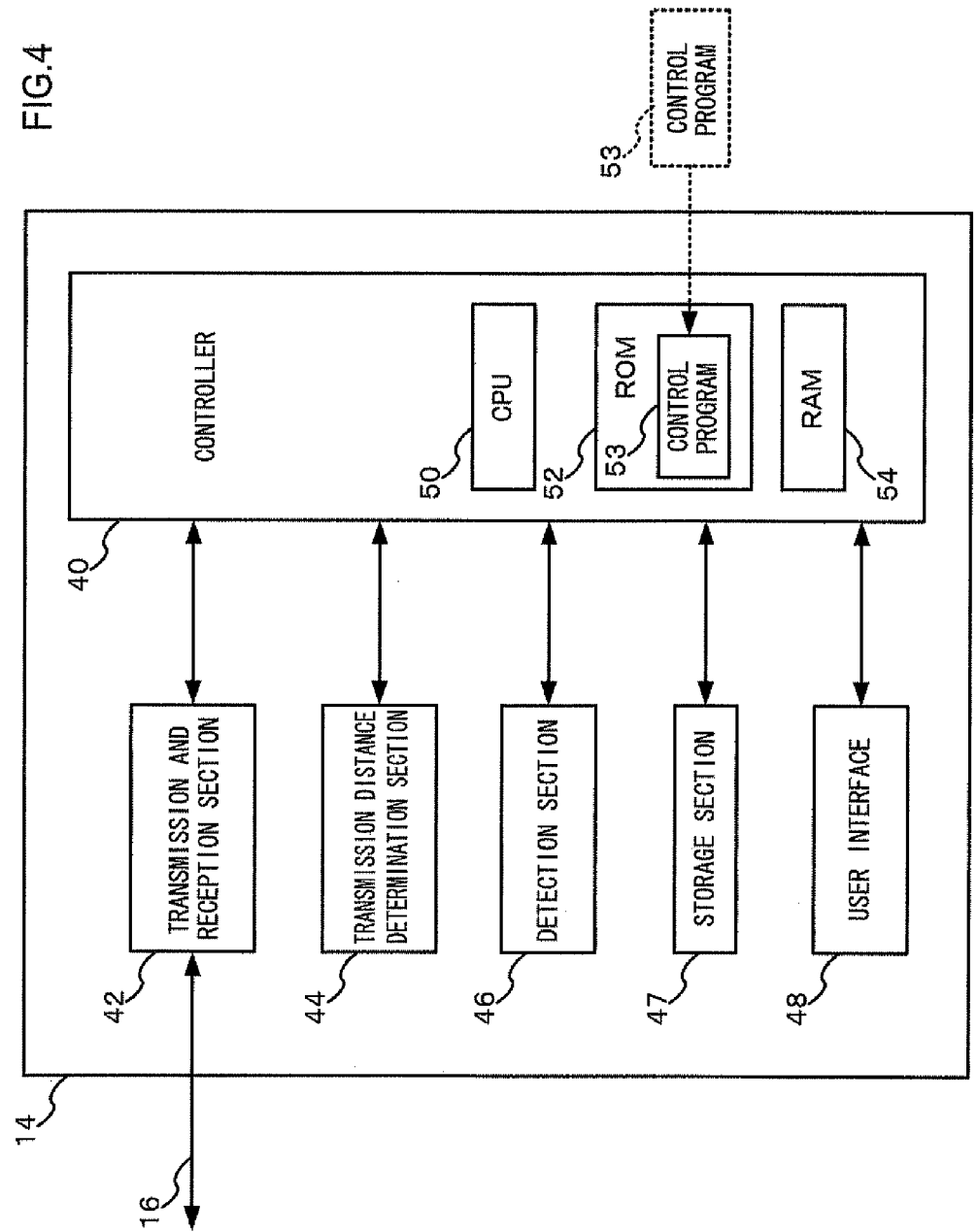
FIG. 4 is a functional block diagram showing an example of a schematic configuration of an image forming apparatus according to the present exemplary embodiment.

A functional block diagram of an example of a schematic configuration of the image forming apparatus 14 is shown in FIG. 4. The image forming apparatus 14 of the present exemplary embodiment is configured including a controller 40, a transmitter and receiver section 42, a transmission distance determination section 44, a detection section 46, a storage section 47, and a user interface 48. The image forming apparatus 14 is provided with an image forming component for forming an image, on a recording medium or the like, based on a signal expressing image data, a control signal, and the like, received from the controller 12.

The controller 40 performs overall control of the image forming apparatus 14, and specifically is configured including a CPU 50, ROM 52, and RAM 54. A control program 53, executed by the CPU 50 for control, is stored on the ROM 52. In the present exemplary embodiment, the control program 53 is configured pre-stored, however there is no limitation thereto. Configuration may be made such that the control program 53 is stored on a storage medium, such as, for example, a CD-ROM or a removable disk, and installed in the controller 40 from the storage medium, or configuration may be made with the control program 53 installed to the controller 40 from an external device through a communication line, such as, for example, the Internet or the like. The RAM 54 secures an operational region for when the control program 53 is executed by the CPU 50.

The transmitter and receiver section 42 is for transmitting and receiving various signals to and from the image forming apparatus 14 through the cable 16, such as, for example, signals expressing image data, test signals (described in detail below), and other control signals. A plug of the cable 16 is therefore connected to a connector provided to the transmitter and receiver section 42.

The transmission distance determination section 44 is for determining the length of the cable 16, this being the separation distance for transmitting signals. In the present exemplary embodiment, as a specific example thereof, a clock signal is transmitted to the controller 12 by the transmitter and receiver section 42, the duration until the clock signal returns from the controller 12 is detected, and the cable length is determined by converting the detected duration into a separation distance.

More specifically, the present exemplary embodiment employs a determination clock signal of 5 Gclocks (CLK)/second(s) (1 clock (CLK)=200 pico seconds (ps)). Since the speed of light is $3\times10^8$ m/s, the travelling separation distance of 1 CLK is $3\times10^8\times200\times10^{-12}=0.06$ m. The predetermined clock signal is transmitted to the controller 12, and the number of clocks required until the predetermined clock signal is received after returning from the controller 12 is counted. The separation distance is computed by conversion from the counted clock number based on the travelling separation distance of 1 CLK. Since counting is performed for the duration of out and return, the length of the cable 16, connecting the image forming apparatus 14 and the controller 12, is determined either by converting half the number of clocks counted into a separation distance, or by halving the separation distance from conversion of the total number of clocks. Since the clock signal is transmitted out and return, the duration is twice that of one-way transmitter, and so in this case determination of cable length is with a precision of 3 cm.

While employing a predetermined clock signal of 1 CLK is described above, in practice, since it is not known whether a 1 CLK signal has been transmitted from the image forming apparatus 14 to the controller 12, a clock signal of 2 CLK or 4 CLK may be employed.

When determining the length of the cable 16, in consideration that the state of the connecting cable 16 is still not known, and that sometimes problems occur, the determination clock signal may be transmitted and received at lower rate than when transmitting and receiving other signals, such as signals expressing image data, or the like.

Figure 5:
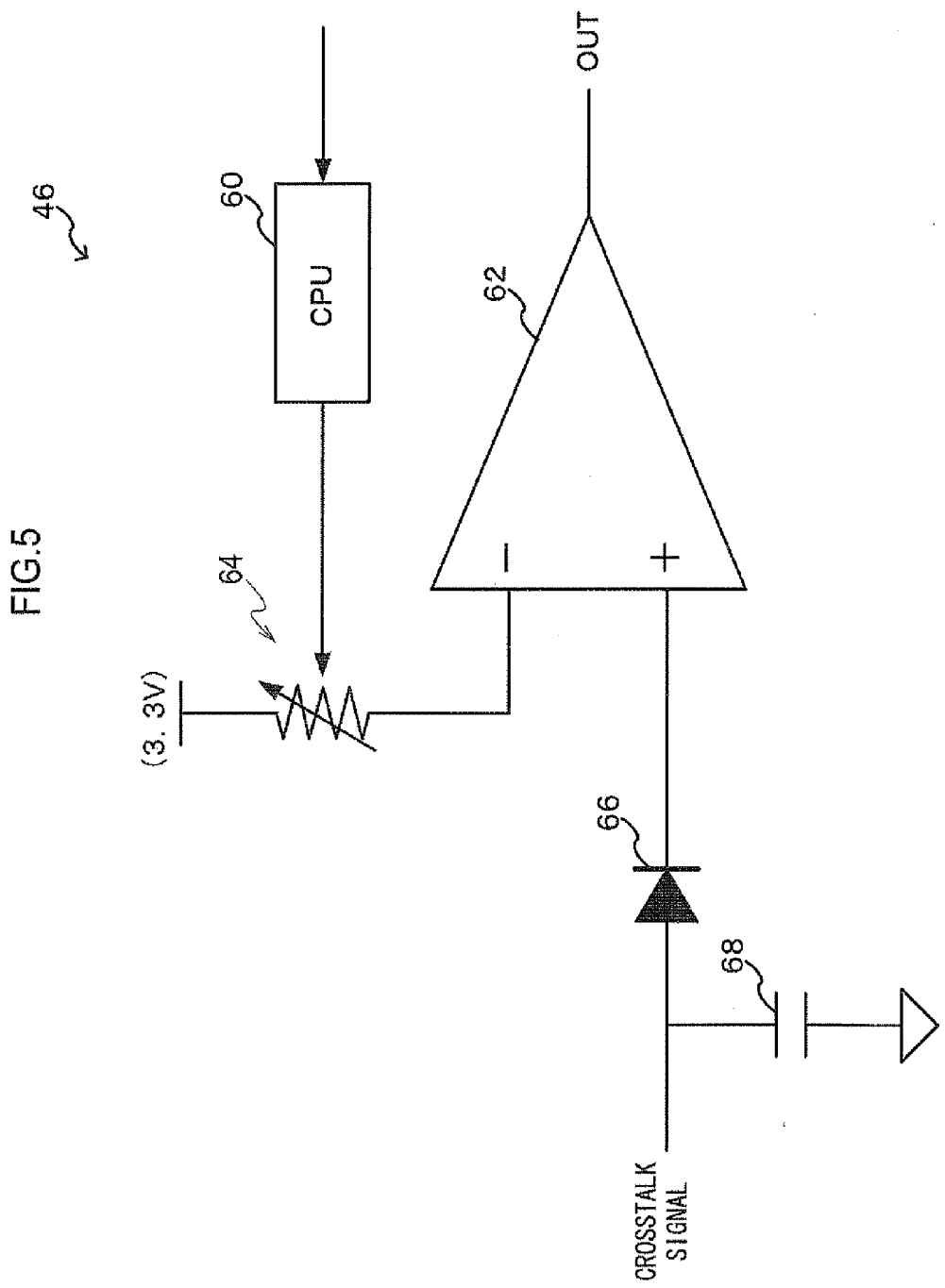
FIG. 5 is a schematic configuration diagram showing a specific example of a detector according to the present exemplary embodiment.

The detection section 46 has functionality for comparing a threshold value voltage, this being a standard voltage value, with the voltage value of a crosstalk signal occurring in a signal line due to transmitter of a detection signal in another signal line, and detecting which is the highest. A schematic configuration diagram of an example of a schematic configuration of the detection section 46 is shown in FIG. 5.

The detection section 46 of the present exemplary embodiment is configured including a CPU 60, a comparator 62, a variable resistor 64, a diode 66, and a condenser 68. The CPU 60 controls the resistance value of the variable resistor 64, such that the threshold value voltage according to the length of the cable 16 is input to the input terminal on the minus side of the comparator 62. The diode 66 and the condenser 68 convert a crosstalk signal into a direct current (DC). The comparator 62 has functionally for comparing the threshold value voltage with the voltage value of the crosstalk signal, and outputting the comparison result.

In the storage section 47 of the present exemplary embodiment, for example, a correspondence relationship, between the threshold value voltage and the length of the cable 16, for example, details thereof follow, is stored in advance.

The user interface 48 has functionally for receiving, for example, various instructions input by a user, and displaying, for example, various information to a user. Specific examples of the user interface 48 include a touch panel, a display, a keyboard, speakers.

Next, explanation follows of processing executed in the signal processing system 10 of the present exemplary embodiment to detect the quality of the cable 16, connecting the controller 12 and the image forming apparatus 14, and to inform a user of the signal processing system 10 whether or not an appropriate cable is connected. The present exemplary embodiment, as a specific example, is the signal processing system 10 in which the controller 12 and the image forming apparatus 14 are connected together by the CAT 7 cable 16. However, when an appropriate cable is not connected, such as in cases where misconnection is made with a cable of lower category than CAT 7, due to the shape of the connectors for connecting the cable 16 being the same, cases where there is a break in the shielding protecting the cable part of the way along the cable 16, and the like, the fact that an appropriate cable is not connected is displayed to a user.

Figure 6:
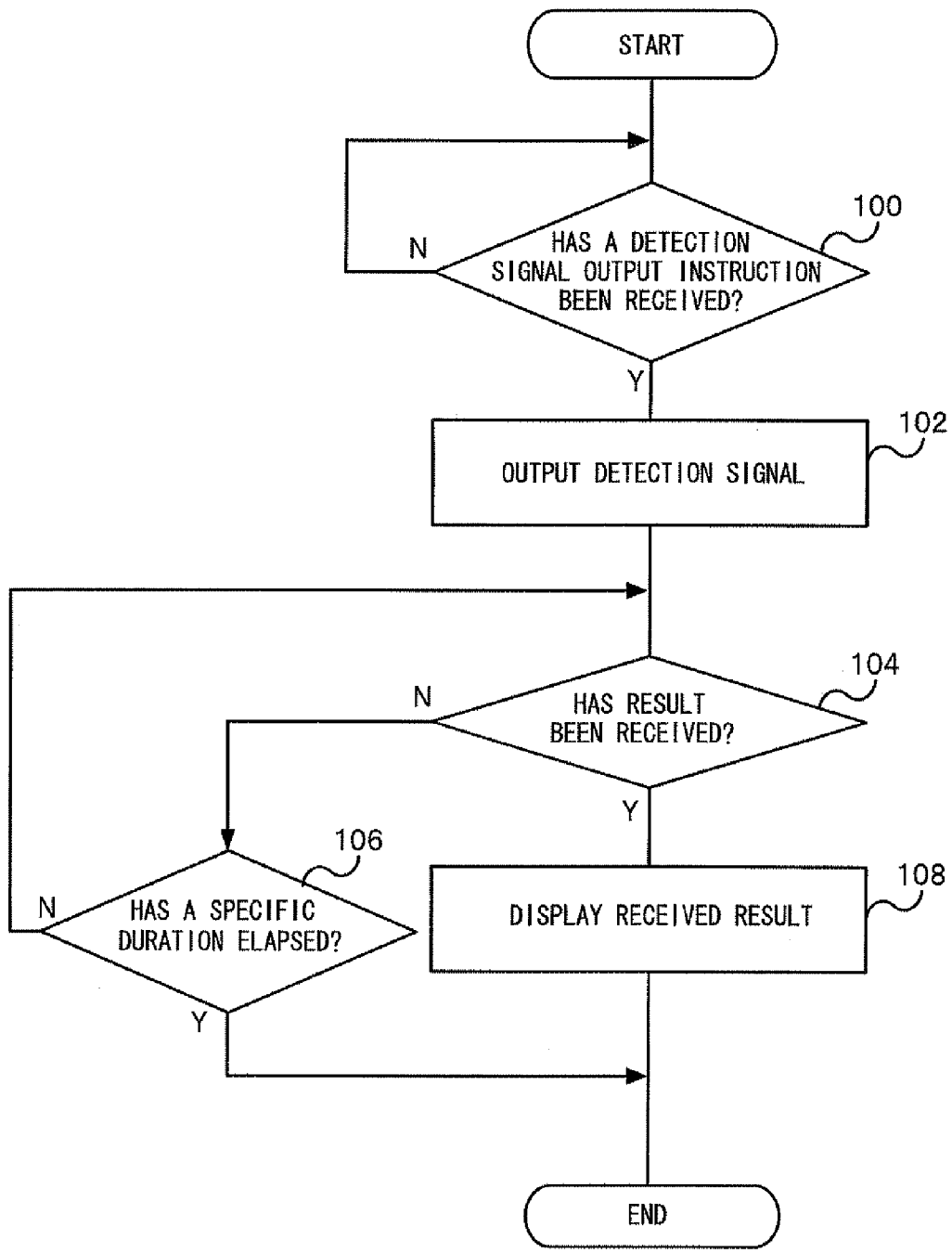
FIG. 6 is a flow chart showing a specific example of processing executed by a controller according to the present exemplary embodiment.

First explanation is given regarding the processing executed by the controller 20 of the controller 12. FIG. 6 shows a flow chart of a specific example of processing executed by the controller 20. This processing is executed when a plug of the cable 16 has been connected to the connector provided to the transmitting and receiving section 22 of the controller 12.

At step 100, determination is made as to whether or not a detection signal output instruction has been received. In the signal processing system 10 of the present exemplary embodiment, since the image forming apparatus 14 performs main control for detection of the quality of the cable 16, the image forming apparatus 14 transmits to the controller 12 an instruction to output a detection signal. In consideration that the state of the connecting cable 16 is still not known, and that problems sometimes occur, configuration may be made such that the image forming apparatus 14 transmits the signal, instructing output, at a lower rate than when transmitting and receiving other signals, such as signals expressing image data, or the like.

At step 100, when a detection signal output instruction has not yet been received from the image forming apparatus 14, negative determination is made and a standby state is adopted. When a detection signal output instruction has been received, positive determination is made and processing proceeds to step 102.

At step 102, to accompany the output instruction received at step 100, a detection signal is output to the image forming apparatus 14. There are no particular limitations to this detection signal, as long as it is a signal of predetermined waveform, and a common mode clock signal may be employed. The clock signal employed by the transmission distance determination section 44 to determine the length of the cable 16, as described above, or a substantially similar clock signal thereto may be employed. In the present exemplary embodiment, as a specific example, the detection signal (clock signal) is output to the pin 4 signal line.

When the detection signal is transmitted in this manner, interference occurs to other signal lines than the pin 4 signal line, generating a signal (crosstalk signal) by crosstalk due to the transmitted detection signal. In the present exemplary embodiment, the image forming apparatus 14 receives a crosstalk signal generated in the pin 6 signal line, and the quality of the cable 16 is detected using the received crosstalk signal and the threshold value (described in detail below), and the detection result transmitted to the controller 12.

Consequently, after the detection signal has been output, at step 104, determination is made as to whether or not the result from detection by the image forming apparatus 14 of quality of the cable 16 has been received. When no receipt has been made, negative determination is made and the processing proceeds to step 106, where determination is made as to whether or not a specific duration has elapsed. In the present exemplary embodiment, when the detection result of quality of the cable 16 is "good", the image forming apparatus 14 does not output anything to the controller 12, and only outputs a report of "no good" when the detection result is "no good", Therefore, when, even though the specific duration (a predetermined duration required for the image forming apparatus 14 to detect the quality of the cable 16) has elapsed, a detection result has not been received from the image forming apparatus 14, since this indicates that the quality of the cable 16 is "good", positive determination is made at step 106, and the current processing is ended.

However, when at step 106 the specific duration has not yet elapsed, processing returns to step 104. When a result of detection of the cable 16 has been received from the image forming apparatus 14 of the quality at step 104, positive determination is made, the processing proceeds to step 108, and after the received result has been displayed to a user with the user interface 26, the current processing is ended. Note that in the present exemplary embodiment, as stated above, display is performed indicating that the cable 16 is "no good". Accordingly, the fact that the cable 16 is "no good" is, for example, notified to users in the vicinity of the controller 12.

Figure 7:
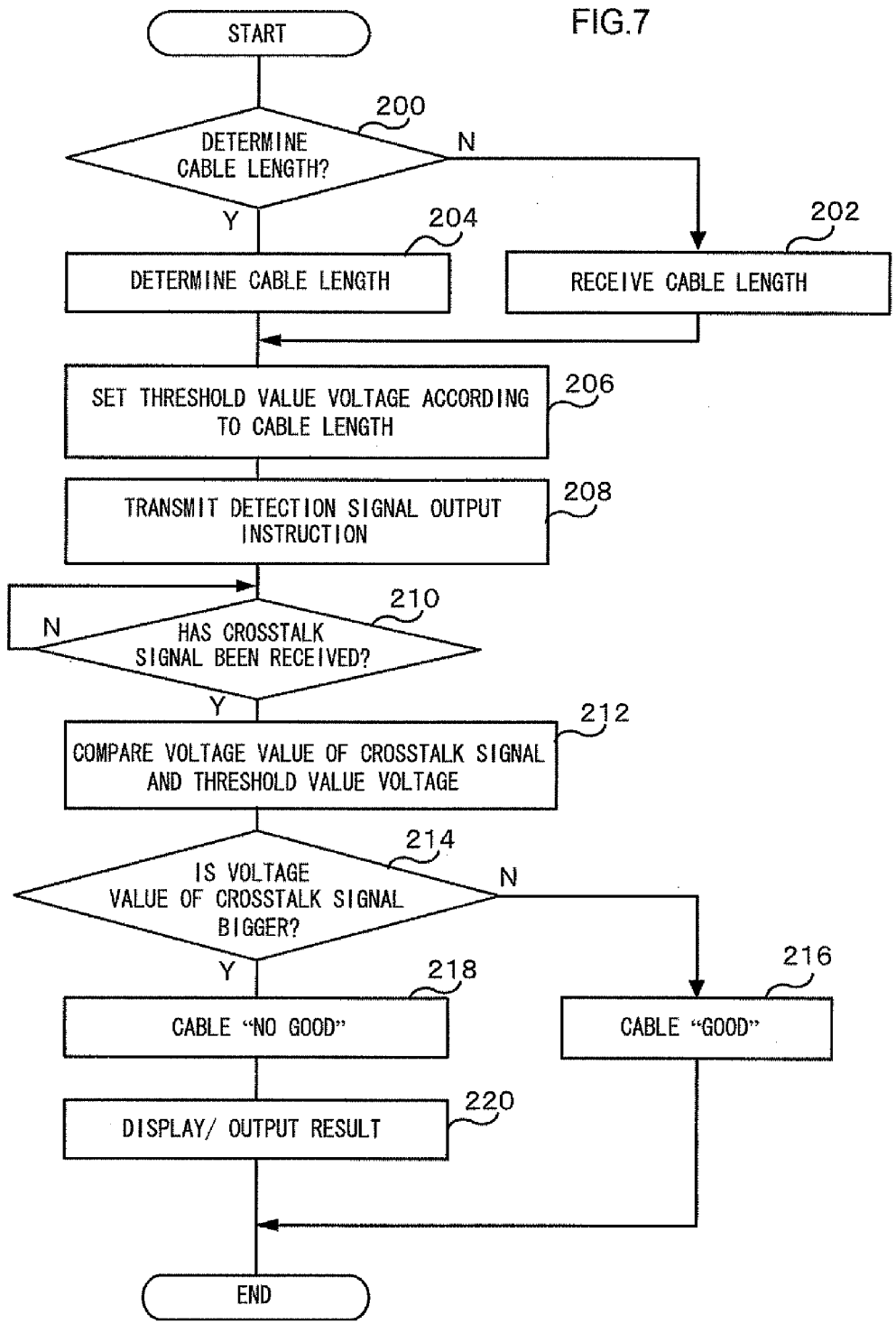
FIG. 7 is a flow chart showing a specific example of processing executed by a controller according to the present exemplary embodiment.

Explanation follows regarding processing executed by the controller 40 of the image forming apparatus 14. FIG. 7 shows a flow chart of a specific example of processing executed in the controller 40. This processing is executed when a plug of the cable 16 has been connected to the connector provided to the transmitter and receiver section 42 of the image forming apparatus 14.

At step 200, determination is made as to whether or not to determine the cable length. In the present exemplary embodiment, as a specific example, the length of the cable 16 is determined when a user gives an instruction, through the user interface 48, to determine the length of the cable 16. Consequently, when not instructed by a user, negative determination is made and the processing proceeds to step 202. At step 202, the length of the cable 16 input by a user through the user interface 48 is received. When positive determination is made at step 200, the processing proceeds to step 204, and transmitter and receiver of a clock signal for determining the length of the cable 16 is performed, as described above, and the length of the cable 16 is determined. Note that configuration may be made such that, when performing determination of the cable 16, and when receiving the length of the cable 16, this length is stored in the storage section 47, and unless specifically instructed otherwise, from the next time onwards in the current processing (detection processing of the cable 16) the cable length that has been stored in the storage section 47 is read out and used in the current processing.

In the next step 206, a threshold value voltage according to the length of the cable 16 is set in the detection section 46. In the present exemplary embodiment, as a specific example of setting the threshold value voltage in the detection section 46, setting is made based on a correspondence relationship, between the length of the cable 16 (cable length) and threshold value voltage, stored in the storage section 47. When the length of the cable 16 is notified to the detection section 46, the CPU 60 reads out the threshold value voltage that corresponds to the informed length of the cable 16 (cable length) from the storage section 47. A specific example of the correspondence relationship between cable length and threshold value voltage, pre-stored in the storage section 47, is shown in FIG. 8. In the present exemplary embodiment the CPU 60 reads out the threshold value voltage corresponding to the notified cable length from the storage section 47. When the notified cable length itself is not one of the cable lengths shown in the correspondence relationship stored in the storage section 47 (specifically, in the case shown in FIG. 8, when the cable length is not one or other of 1 m, 2 m, 3 m, 5 m or 10 m), then configuration may be made such that the threshold value voltage is read out corresponding to the nearest length to the determined cable length. For example, if the cable length is 7 m, then configuration may be made such that the threshold value voltage corresponding to 5 m is read out. However, the present invention is not limited to such exemplary embodiments, and, for example, configuration may be made such that, for example, the threshold value voltage corresponding to the length that is the nearest shorter length to the determined cable length, the length that is the nearest longer length to the determined cable length, is read out. The CPU 60 modulates the resistance value of the variable resistor 64 such that the read threshold value voltage is input to the input terminal on the minus side of the comparator 62.

Setting the threshold value voltage in the detection section 46 is not limited to this method. Another specific example thereof is a configuration in which a computation formula for computing the threshold value voltage according to the cable length (for example, f(d)=V, D: cable length, V: threshold value voltage) is obtained in advance, and stored in the storage section 47. In this example modulation of the resistance value of the variable resistor 64 is performed such that a threshold value voltage computed according to this computation formula is input to the input terminal on the minus side of the comparator 62.

Next, at step 208, the detection signal output instruction (see step 100 of controller 12 described above) is transmitted to the controller 12. Next, at step 210, determination is made as to whether or not a crosstalk signal has been received from the pin 6 signal line. When not yet received, negative determination is made, and a standby mode adopted. However, when the crosstalk signal has been received, positive determination is made and the processing proceeds to step 212. The crosstalk signal received by the transmitter and receiver section 42 is input to the detection section 46.

At step 212, the voltage value of the received crosstalk signal is compared with the threshold value voltage using the comparator 62 of the detection section 46. In the present exemplary embodiment, the crosstalk signal input to the detection section 46 is converted by the diode 66 and the condenser 68 into a direct current (DC) and input to the input terminal on the plus side of the comparator 62. The comparator 62 compares the threshold value voltage input to the input terminal on the minus side with the voltage value of the crosstalk signal input to the input terminal on the plus side, and outputs the comparison result. In the comparator 62 of the present exemplary embodiment, when the threshold value voltage is the larger voltage, a low (L) level signal is output, and when it is the crosstalk signal that is the larger voltage, a high (H) level signal is output.

At the next step 214, determination is made as to whether or not the voltage value of the crosstalk signal is larger than the threshold value voltage. Explanation follows regarding the relationship in the present exemplary embodiment between the threshold value voltage, voltage value of the crosstalk signal, and the state of the cable 16. In the signal processing system 10 of the present exemplary embodiment, when the cable 16 is a CAT 7 cable, the quality of the cable is said to be "good" (an appropriate cable is connected).

Explanation follows of a case in which the cable 16 is a cable of lower category than CAT 7. In the case of a cable of lower category than CAT 7, due to the cable not being electromagnetically shielded, a crosstalk signal is generated that is greater than with CAT 7. The crosstalk signal occurring when the detection signal is transmitted using a cable 16 of CAT 7, and the crosstalk signal occurring when the detection signal is transmitted using a cable 16 of lower category than CAT 7 (for example, CAT6e), are detected in advance using a device performing sampling at a high speed sampling rate, such as, for example, an oscilloscope or the like, and the respective peak-to-peak voltages thereof derived, so as to obtain the threshold value voltage in advance. As a specific example thereof, for a cable 16 of 10 m length, the peak-to-peak voltage of a crosstalk signal is 88 mV for CAT 7, and the peak-to-peak voltage of a crosstalk signal is 116 mV for CAT 6e. Consequently, in the present exemplary embodiment, the threshold value voltage when the cable 16 is 10 m long is predetermined as 100 mV, such that appropriate determination is made of "no good" when the voltage value of the received crosstalk signal is 100 mV or greater, and "good" when the less than 100 mV.

In cases where the cable 16 is CAT 7 but the shielding is damaged, an abnormally large crosstalk signal is generated, similarly to when connection is made with a cable of lower category.

In this manner, it can be seen that when the voltage value of the crosstalk signal is the threshold value voltage or greater, this indicates a state in which a cable of lower category than CAT 7 is connected, or that the shielding is damaged, the quality of the cable 16 is "no good", and an appropriate cable is not connected.

At step 214, when the voltage value of the crosstalk signal is less than the threshold value voltage, negative determination is made and the processing proceeds to step 216, the quality of the cable 16 is determined to be "good", and the current processing is ended. However, when the voltage value of the crosstalk signal is the threshold value voltage or greater, positive determination is made at step 214 and the processing proceeds to step 218, and, as described above, the quality of the cable 16 is determined to be "no good", and the processing proceeds to step 220. At step 220, after displaying to a user the fact that the cable 16 is "no good", and outputting to the controller 12, the current processing is ended. Configuration may be made such that, as in the present exemplary embodiment, the fact that the cable 16 is "no good" is displayed and output. In the image forming apparatus 14, display of the result is, for example, by the user interface 48 or the like, performed by visible display or audible announcement, or the result may be displayed as text or the like for permanent visible display by image forming on a recording medium (printing out). The fact that the cable 16 is "no good" can thereby be notified, for example, to users present in the vicinity of the image forming apparatus 14. The result may also be stored on the storage section 47. Configuration may be made such that when the result is output to the controller 12, since the state of the cable 16 is "no good", namely inappropriate connection is made, communication may be performed using a lower rate of transmitter than when transmitting and receiving other signals, such as signals expressing image data, or the like, or communication may be performed without using the cable 16, such as, for example, by wireless communication or the like.

In the present exemplary embodiment as explained above, in the signal processing system 10 with the controller 12 and the image forming apparatus 14 connected together through the cable 16 having plural (8) signal lines, the controller 12 transmits the detection signal with the transmitting and receiving section 22 to the image forming apparatus 14 utilizing the pin 4 signal line. In the image forming apparatus 14, the crosstalk signal occurring in the pin 6 signal line due to the transmitted detection signal is received by the transmitter and receiver section 42. The image forming apparatus 14 determines the length of the cable 16 with the transmission distance determination section 44, the threshold value voltage corresponding to the determined cable length is read from the storage section 47, and set in the detection section 46. The comparator 62 of the transmitter and receiver section 42 compares the voltage value of the received crosstalk signal and the threshold value voltage, and outputs a comparison result indicating which of these values is the greater. When the voltage value of the crosstalk signal is greater than the threshold value voltage, since the cable 16 is "no good" and inappropriate for transmitting and receiving signals, this is notified to users using the user interface 48, and also notified to users with the user interface 26.

The present exemplary embodiment can determine the state of the cable 16 by a comparison result made by a comparison of the comparator 62 of the voltage value of the crosstalk signal, occurring due to the detection signal, and the threshold value voltage. Consequently, transmitter and receiver of signals by an inappropriate transmission path is prevented using a simpler configuration than cases where an interference signal is detected with a device performing high speed sampling.

By providing a configuration that detects whether or not the voltage value of the crosstalk signal received by the detection section 46 of the image forming apparatus 14 is zero, since no crosstalk is generated when the cable 16 has been severed, transmitter and receiver of signals by the inappropriate cable 16 that is severed is prevented.

There is no limitation to the explained present exemplary embodiment, with the signal processing system 10 in which the controller 12 and the image forming apparatus 14 are connected together through the cable 16. For example, application may be made to a signal processing system having a signal processing apparatus, not processing image forming functionally, and a controller, are connected together through a cable, or application may be made to a signal processing system provided with two devices that are mutually connected together through a cable so as to transmit and receive signals between each other.

In the present exemplary embodiment, explanation has been given of a case of in which the image forming apparatus 14 functions as a signal processing apparatus performing main control of detection of the quality of the cable 16, however there is no limitation thereto, and configuration may be made with the controller 12 performing main control. Configuration may also be made in which a transmission distance determination section 44 and a detection section 46 are provided in the controller 12.

In the present exemplary embodiment, configuration is made such that the processing described above is executed when the controller 12 and the image forming apparatus 14, and the cable 16 are connected to connectors, however there is no limitation thereto. For example, configuration may be made such that the processing described above is executed every time image forming is performed by the image forming apparatus 14, prior to transmitting a signal expressing image data from the controller 12 to the image forming apparatus 14. In such cases, image forming processing may be performed after the controller 40 of the image forming apparatus 14 has determined that the quality of the cable 16 is "good" in the processing of step 216 described above.

There is no limitation to the present exemplary embodiment in which the controller 12 outputs the detection signal to the pin 4 signal line of the cable 16. Configuration may be made so as to output to another pin signal line, or to plural signal lines (for example both signal lines of a pair). Also, while the image forming apparatus 14 receives the crosstalk signal occurring in the pin 6 signal line of the cable 16, and utilizes this crosstalk signal, there is no limitation thereto. Configuration may be made such that receiver is made of a crosstalk signal occurring in another of the pin signal lines, or in respective plural signal lines (for example both signal lines of a pair). In cases where crosstalk signals occurring in plural signal lines are respectively received, by configuration such that these received crosstalk signals are each be compared with the threshold value voltage, and making determination that the quality of the cable 16 is "no good" when at least one thereof is greater than the threshold value, transmitter and receiver of signals by inappropriate cable 16 is prevented with greater precision. While there are no particular limitations to the signal line for transmitting the detection signal, and to the signal line for receiving the crosstalk signal, preferably these signal lines are set as adjacent lines to each other, since crosstalk (interference) occurring due to the detection signal is thereby made larger.

While in the present exemplary embodiment, a case of the cable 16 being a cable of lower category than CAT 7 is inappropriate, there is no limitation thereto. For example, in a signal processing system 10 in which the cable 16 is required to be a CAT 6 cable, when the cable 16 is a cable with a higher category than CAT 6 (for example, CAT 7) this may be configured as inappropriate. Note that in such a configuration, when the voltage value of the crosstalk signal is compared with the comparator 62 of the image forming apparatus 14 and found to be smaller than the threshold value voltage, this case may be treated as being "no good".

While in the present exemplary embodiment, users are notified by utilizing both the user interface 26 and the user interface 48, there is no limitation thereto, and, for example, one or other thereof may be utilized alone for notification.

What is claimed is:

1. A signal processing system comprising:
   a transmitter component that transmits a predetermined detection signal, using one or other of a plurality of signal lines of a transmitter path;
   a receiver component that receives an interference signal, occurring in a different signal line from the signal line the transmitter component used for transmitting the detection signal, the interference signal occurring from interference due to the detection signal transmitted from the transmitter component;
   a storage component that stores a correspondence relationship between length of signal line and a predetermined reference voltage value according to signal line length;
   a determining component that determines signal line length;
   a comparison component that derives the reference voltage value that accords with the signal line length determined by the determining component from the correspondence relationship and that compares a voltage value of the interference signal received by the receiver component with the derived reference voltage value; and
   an execution component that, based on a comparison result of comparison by the comparison component, executes predetermined processing according to the comparison result.

2. The signal processing system of claim 1, wherein, when the comparison result, from the comparison component comparing the voltage value of the interference signal and the derived reference voltage value, is that the voltage value of the interference signal is greater than the derived reference voltage value, the execution component executes predetermined processing to provide notification that the transmitter path is inappropriate as the comparison result.

3. The signal processing system of claim 1, further comprising:
   a display component that displays the comparison result from comparison by the comparison component, wherein the predetermined processing executed by the execution component is at least one processing from visual display, audible announcement, and/or permanent visible display of the comparison result on the display component.

4. A signal processing system comprising:
   a transmitter component that transmits a predetermined detection signal, using one or other of a plurality of signal lines of a transmitter path;
   a receiver component that receives an interference signal, occurring in a different signal line from the signal line the transmitter component used for transmitting the detection signal, the interference signal occurring from interference due to the detection signal transmitted from the transmitter component;
   a storage component that stores a relationship between length of signal line and a predetermined reference voltage value according to signal line length;

a setting component that sets signal line length;

a comparison component that compares a voltage value of the interference signal received by the receiver component with the reference voltage value that accords with the signal line length notified by the setting component based on the relationship stored in the storage component; and an execution component that, based on a comparison result of comparison by the comparison component, executes predetermined processing according to the comparison result.

5. The signal processing system of claim 4, wherein, when the comparison result, from the comparison component comparing the voltage value of the interference signal and the reference voltage value, is that the voltage value of the interference signal is greater than the reference voltage value, the execution component executes predetermined processing to provide notification that the transmitter path is inappropriate as the comparison result.

6. The signal processing system of claim 4, further comprising:

a display component that displays the comparison result from comparison by the comparison component, wherein the predetermined processing executed by the execution component is at least one processing from visual display, audible announcement, and/or permanent visible display of the comparison result on the display component.

* * * * *